United States Patent
Cohn et al.

(10) Patent No.: US 11,258,503 B2
(45) Date of Patent: Feb. 22, 2022

(54) COMMUNICATION CONTROL METHOD AND SYSTEM

(71) Applicant: Intel Corporation, Santa Clara, CA (US)

(72) Inventors: Daniel Cohn, Raanana (IL); Itzik Shahar, Kadima (IL); Ofer Markovits, Haifa (IL); Ran Mor, Herzliya (IL)

(73) Assignee: Intel Corporation, Santa Clara, CA (US)

(*) Notice: Subject to any disclaimer, the term of this patent is extended or adjusted under 35 U.S.C. 154(b) by 43 days.

(21) Appl. No.: 16/500,256

(22) PCT Filed: Jun. 30, 2017

(86) PCT No.: PCT/US2017/040422
§ 371 (c)(1),
(2) Date: Oct. 2, 2019

(87) PCT Pub. No.: WO2019/005134
PCT Pub. Date: Jan. 3, 2019

(65) Prior Publication Data
US 2021/0135739 A1    May 6, 2021

(51) Int. Cl.
*H04B 7/06* (2006.01)
(52) U.S. Cl.
CPC ......... *H04B 7/0697* (2013.01); *H04B 7/0689* (2013.01); *H04B 7/0693* (2013.01)
(58) Field of Classification Search
CPC .. H04B 7/0697; H04B 7/0689; H04B 7/0693; H04B 7/06; H04B 7/0691
See application file for complete search history.

(56) References Cited

U.S. PATENT DOCUMENTS

| | | | |
|---|---|---|---|
| 2015/0181469 A1* | 6/2015 | Yu | H04W 28/18 370/311 |
| 2016/0360489 A1* | 12/2016 | Boodannavar | H04W 52/0261 |
| 2018/0359017 A1* | 12/2018 | Kwon | H04B 7/0689 |

FOREIGN PATENT DOCUMENTS

EP    2867999 A1    5/2015

OTHER PUBLICATIONS

European Patent Office, PCT Search Report issued for PCT/US2017/040422, 3 pgs., dated Mar. 7, 2018.

* cited by examiner

*Primary Examiner* — Thai Nguyen
(74) *Attorney, Agent, or Firm* — Schiff Hardin LLP

(57) ABSTRACT

A communication device configured to operate in a Multiple-input Multiple-output (MIMO) operation mode and Single-input Single output (SISO) operation mode and operation mode switching method are described. The communication device can include a transceiver associated with a first antenna, and configured to wirelessly communicate via the first antenna using a first communication technology; a second antenna associated with a second communication technology different from the first communication technology; and a controller coupled to the transceiver. The controller can be configured to: determine communication information corresponding to the first and the second communication technologies; and control the communication device to switch an operation mode of the communication device between the MIMO operation mode and the SISO operation mode based on the determined communication information.

21 Claims, 5 Drawing Sheets

COMMUNICATION CONTROL METHOD AND SYSTEM

BACKGROUND

Field

Aspects described herein generally relate to control methods and systems for wireless communications, including control methods and systems for coordinating collocated wireless technologies in Multiple-input Multiple-output (MIMO) configurations and selectively switching between MIMO and Single-input Single output (SISO) configurations.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

Figure 1:
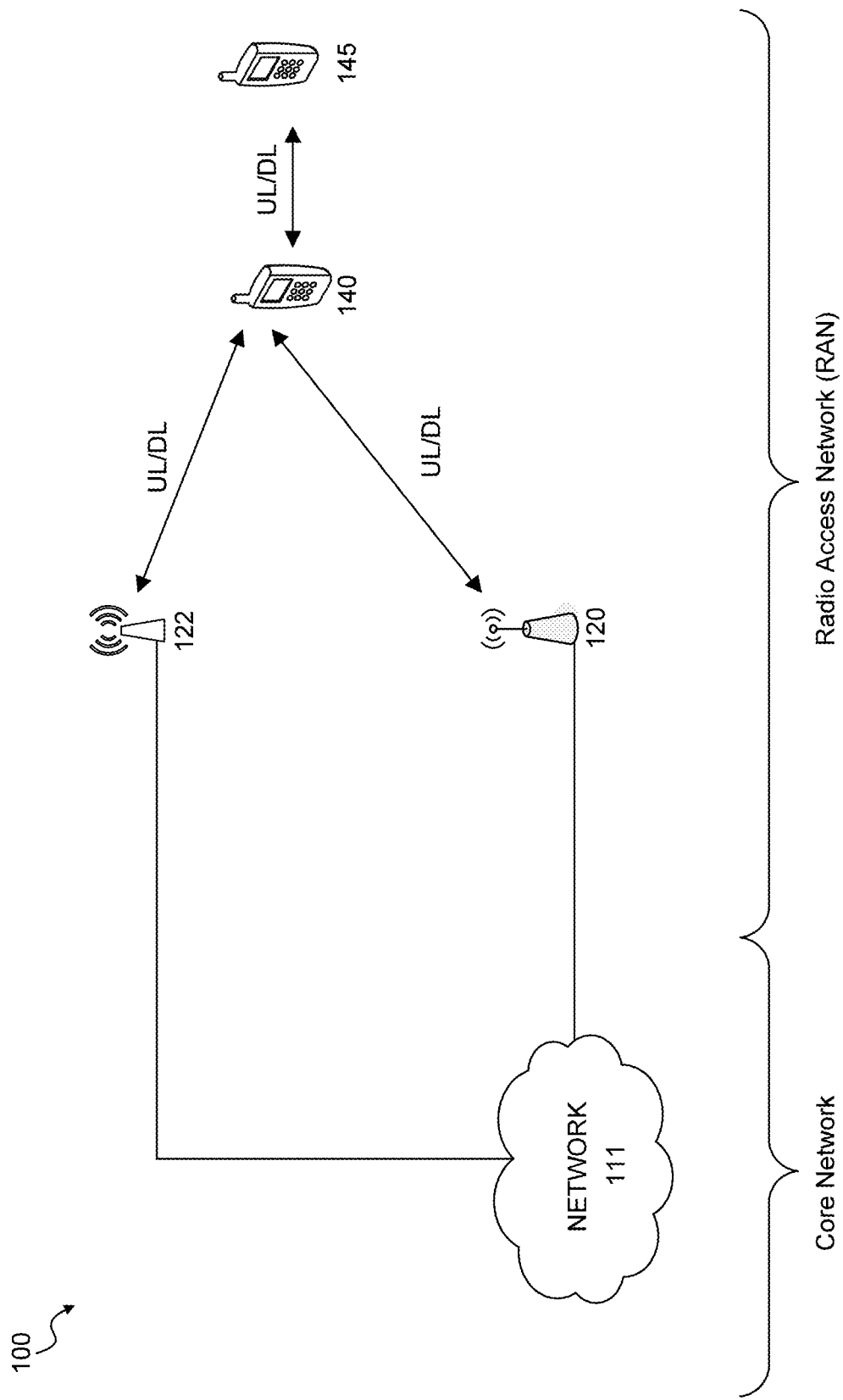
FIG. 1 illustrate an example network environment having a non-collocated base station and access point.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

As an overview, communication systems can utilize multiple radio access technologies (RATs). Devices of the communication system can include wireless interfaces for the various RATs that are collocated. For example, a communication device can include interfaces for wireless local area network (WLAN) protocols (e.g., one or more Institute of Electrical and Electronics Engineers (IEEE) 802.11 protocols); one or more Bluetooth protocols (e.g. IEEE 802.15.1, Bluetooth Special Interest Group, Industrial, Scientific and Medical (ISM) radio bands—e.g. 2.4 to 2.485 GHz); one or more cellular technologies (e.g. Long Term Evolution (LTE) protocol); and/or one or more other wireless communication technology as would be understood by one of ordinary skill in the art. For example, a communication device can communicate with a base station using, for example, the LTE protocol and an access point (AP) using, for example, one or more WLAN protocols; and/or with one or more other communication devices (or other AP/base station) via one or more Bluetooth protocols. In this example, the base station and the AP can be associated with the same backhaul network or different backhaul networks.

With collocated communication interfaces, there is a potential for interference between the interfaces (e.g. mutual interference). For example, WLAN and Bluetooth interfaces in a communication device (whether in the same or different integrated circuits/chips) may interfere with each other in the radio frequency (RF) domain (e.g. WLAN can utilize the 2.4 GHz band that may interfere with Bluetooth reception).

Further, one or more communication technologies can be configured for MIMO operation. For example, the WLAN interface can be configured for WLAN MIMO operation, where one or more antenna elements and/or RF components are shared by the WLAN interface and another (e.g. Bluetooth) interface, and one or more other antenna elements and/or RF components are exclusive (e.g. not shared) for the WLAN interface.

In an exemplary aspect, the communication device can be configured to time multiplex the communication technologies to separate the coexisting technologies in time. In an exemplary aspect, for periodic communication traffic patterns having relatively long periods (e.g. hundreds of milliseconds), time multiplexing can be coordinated a priori using one or more power saving techniques to ensure one technology will not transmit while the other is transmitting. In an exemplary aspect, uncoordinated time multiplexing can be used. For uncoordinated time multiplexing, the communication device can be configured to determine which technology will be allowed to transmit at any given time and which technology transmission will be prevented from transmitting. The determination can be based on a priority scheme.

In an exemplary aspect, the communication device can be configured for a priori coordination, where the communications include short time intervals between transmissions (e.g. voice over Bluetooth or LTE) and WLAN reception using a MIMO configuration (e.g. reception over multiple antennas). In this example, when the other technology (e.g. Bluetooth) transmits data with a higher priority than the received WLAN communication (e.g. Bluetooth voice vs WLAN best-effort data), this transmission will prevent WLAN reception on the shared RF chains/antennas. In a MIMO operation, when one of the MIMO communication streams (e.g. of WLAN) cannot be decoded, the entire transmission may be lost, which could effectively block the MIMO communication until the other technology transmission has stopped. This could results in a reduce throughput for the MIMO communication. Further, the throughput loss may be compounded as a peer communicating via the MIMO communication could react to the lost packets by reducing the transmission rate (e.g. under the assumption that the packet loss is due to insufficient signal quality for the current rate). The decrease in the transmission rate will result in an increased transmission duration, which may result in an increased likelihood of coexistence interference, thereby possibly increasing the packet loss.

In an exemplary aspect, the communication device can be configured to support Multiple-input Multiple-output (MIMO) and Single-input Single output (SISO) communications. In MIMO operation, the communication device uses multiple transmitting radio frequency (RF) chains (e.g. RF components and antennas) and/or multiple receiving RF chains for wireless communications, thereby increasing the capacity of the radio link. In SISO operation, the communication device uses a single transmitting RF chain and/or a single receiving RF chain. In the exemplary aspects described herein, the communication device can include (but is not limited to) a mobile communication device (e.g. smartphone), a base station, and/or an access point. For example, mobile communication devices, base stations, and/or access points can be configured for selective switching between MIMO and SISO, including switching based on radio link performance as described below.

In an exemplary aspect, the communication device can be configured to selectively switch between MIMO and SISO communication operations. In an exemplary aspect, the selective switching is based on the performance and/or estimated performance of the communication device when operating in MIMO versus SISO. For example, with coexisting technologies (e.g. WLAN and Bluetooth) that share RF chains (RF components and antenna elements), SISO may offer a higher performance than MIMO operation due to interference (e.g. mutual interference) between the coexisting technologies during MIMO operation.

In one or more exemplary aspects, the communication device is configured to determine the performance and/or estimate future performance based on communication information, such as one or more wireless characteristics and/or statistics associated with one or more communication interfaces. The selective switching can be based on the communication information (e.g. wireless characteristics and/or statistics associated with one or more communication interfaces), and/or based on the determined performance and/or estimated future performance.

Non-limiting examples of the wireless characteristics include the modulation and coding scheme (MCS) of one or more communication technologies, which may include MCS statistics; throughput and/or goodput statistics of one or more communication technologies; determined packet loss; communication traffic profiles (e.g. no traffic, low priority, high priority, Voice-over-LTE (VoLTE); Bluetooth hand-free profile (Bluetooth HFP), Advanced Audio Distribution Profile (A2DP)); predicted occupation statistics of coexisting communication technologies (e.g. based on communication traffic profile(s)); determined occupation statistics of coexisting communication technologies; and/or one or more wireless characteristics and/or statistics as would be understood by one of ordinary skill in the art.

In an exemplary aspect, the wireless characteristics and/or statistics can include moving window averages, exponential smoothing averages, minimum/maximum over observation window, and/or one or more other data analysis operations as would be understood by one of ordinary skill in the relevant arts.

In an exemplary aspect, the communication device can be configured to signal or instruct (e.g. control) a peer communication device (e.g. base station, AP) to operate using the selected operation mode (MIMO or SISO). For example, a mobile device can transmit a communication (e.g. packet, frame, etc.) to the AP to notify the AP that the mobile device would like to operate in (and/or control the AP to operate in) a SISO communication operation mode for MIMO communications, or vice versa.

In an exemplary aspect, the communication device is configured for spatial multiplexing powersave (SMPS) operation. SMPS allows the communication device to operate with a single active receive RF chain and/or a single active transmit chain. With SMPS, the communication device can reduce power consumption (e.g. by reducing the number of active RF chains), for example, when MIMO data rates are not required.

In an exemplary aspect, the communication device can be configured to selectively switch between MIMO and SISO communication operations using SMPS. The communication device can selectively switch between MIMO and SISO based on the performance and/or estimated future performance (determined based on e.g. wireless characteristics/statistics), where the switching is effectuated using SMPS. In this example, the communication device can use SMPS signaling to communicate the desired operating mode to one or more other communication devices (e.g. AP). In this aspect, the leveraging of SMPS to effectuate operating mode switching is based the performance and/or estimated future performance of the coexisting communications. For example, in addition to (or as an alternative to) using SMPS (e.g. SMPS signaling) for power consumption, the communication device can use SMPS to improve radio link performance in coexistence communication operations, when, for example, SISO communications would provide a greater realized and/or estimated performance over MIMO communications (e.g. SISO performance>MIMO performance). The communication device can then use SMPS to switch back to the MIMO operation mode when the performance gain is no longer realized (e.g. SISO performance≤MIMO performance).

FIG. 1. Illustrates an example communication environment 100 that includes a radio access network (RAN) and a core network. The RAN includes one or more base stations 120 and one or more access points (APs) 122 that are configured to wireless communicate with one or more mobile devices 140. The communication device 140 can be configured to communication with one or more other communication devices 145 via one or more device-to-device communication protocols (e.g. Bluetooth).

The number of base stations 120, APs 122, communication devices 140, communication devices 145, and/or networks 111 are not limited to the exemplary quantities illustrated in FIG. 1, and the communication environment 100 can include any number of the various components as would be understood by one of ordinary skill in the relevant art(s).

The core network includes a backhaul communication network 111. In an exemplary aspect, the backhaul communication network 111 can include one or more well-known communication components—such as one or more network switches, one or more network gateways, and/or one or more servers. The backhaul communication network 111 can include one or more devices and/or components configured to exchange data with one or more other devices and/or components via one or more wired and/or wireless communications protocols. In exemplary aspects, the base station(s) 120 and AP(s) 122 communicate with one or more service providers and/or one or more other base station(s) 120 and/or AP(s) 122 via the backhaul communication network 111. In an exemplary aspect, the backhaul communication network 111 is an internet protocol (IP) backhaul network. The backhaul communication network 111 can include one or more elements of an evolved packet core, including, for example, one or more Mobility Management Entities (MME), serving gateways (S-GW), public data network (PDN) gateways (P-GW), Home Subscriber Servers (HSS), Access Network Discovery and Selection Functions (ANDSF), Evolved Packet Data Gateways (ePDG), and/or one or more other core network components as would be understood by one of ordinary skill in the relevant arts. The base station(s) 120 and AP(s) 122 can share same backhaul network 111 or have different backhaul networks.

The communication device 140, communication device 145, the base station 120, and/or AP 122 can each include one or more transceivers configured to transmit and/or receive wireless communications via one or more wireless technologies within the communication environment 100. The communications can be exchanged via one or more downlink (DL) channels and one or more respective uplink (UL) channels.

In an exemplary aspect, the base station 120, AP 122, and/or communication device 140/145 each include processor circuitry that is configured to communicate via one or more wireless technologies. In an exemplary aspect, the base station 120 and the AP 122 can each support wireless communications conforming to one or more communication protocols. The base station 120 may be, for example, an eNodeB, a small cell, a femto cell, a pico cell, a micro cell, a road side unit, or other infrastructure devices capable of wireless communications. The AP 122 can be a wireless access point, a wireless router, wireless repeater, and/or another infrastructure devices capable of wireless communications. For the ease of discussion, the base station 120 can generally be configured for cellular communication technologies (e.g. LTE) and the AP 122 can general be configured for non-cellular communication technologies (e.g. WLAN), but are not limited thereto.

In an exemplary aspect, the base station 120 supports one or more Long-Term Evolution (LTE) protocols. In this example, the base station 120 can be referred to as LTE base station 120 or eNodeB/eNB 120. Those skilled in the relevant art(s) will understand that the base station 120 is not limited to LTE communications, and can be configured for communications that conform to one or more other protocols in addition to or alternatively to the LTE protocol. In an exemplary aspect, the AP 120 supports one or more IEEE 802.11 protocols. In this example, the AP 122 can be referred to as WLAN AP 122. Those skilled in the relevant art(s) will understand that the AP 122 is not limited to IEEE 802.11 communications, and can be configured for communications that conform to one or more other protocols in addition to or alternatively to the IEEE 802.11 protocols.

In an exemplary aspect, the communication device 140 can be further configured to support co-existing wireless communications with the base station 120, AP 122, and/or one or more other communication devices 145. For example, the communication device 140 can include a WLAN interface configured to communicate with the AP 122, a Bluetooth interface configured to communication with the communication device 145, and/or a cellular interface configured to communicate with the base station 120. The number of interfaces is not limited, and the communication device 140 can include additional or fewer interfaces configured to facilitate communications using one or more wireless and/or wired protocols.

In an exemplary aspect, the communication device 140 can be configured to support Multiple-input Multiple-output (MIMO) and Single-input Single output (SISO) communications. In an exemplary aspect, the communication device 140 can be configured to selectively switch between MIMO and SISO communication operations based on communication information, such as one or more wireless characteristics and/or statistics associated with one or more communication interfaces. Non-limiting examples of the wireless characteristics include the modulation and coding scheme (MCS) of one or more communication technologies, which may include MCS statistics; throughput and/or goodput statistics of one or more communication technologies; determined packet loss; communication traffic profiles (e.g. no traffic, low priority, high priority, Voice-over-LTE (VoLTE); Bluetooth hand-free profile (Bluetooth HFP), Advanced Audio Distribution Profile (A2DP)); predicted occupation statistics of coexisting communication technologies (e.g. based on communication traffic profile(s)); determined occupation statistics of coexisting communication technologies; and/or one or more wireless characteristics and/or statistics as would be understood by one of ordinary skill in the art.

In an exemplary aspect, with the collocation of communication interfaces, the communication device 140 can be configured such that two or more wireless technologies share one or more antenna elements and/or radio frequency (RF) components. For example, the WLAN communication technology and the Bluetooth communication technology can share one or more antenna elements and/or RF components with the Bluetooth. In an exemplary aspect, one or more of the antenna elements and/or RF components can be dedicated to a particular communication technology, where other antenna element(s) and/or RF component(s) can be shared between two or more communication technologies.

For example, the communication device 140 can include one or more antenna elements (or an antenna array) that are dedicated to the WLAN communication technologies and one more antenna elements that are shared between the WLAN and Bluetooth communication technologies. In an exemplary aspect, the communication device 140 can be configured for MIMO and SISO communication configurations for WLAN communications. In this example, during MIMO operation, the WLAN communications can utilize the antenna element(s) dedicated for the WLAN communication technologies and the antenna element(s) shared with the Bluetooth communication technologies. This is further illustrated in FIGS. 3 and 4 and described below.

Non-limiting examples of the communication devices 140 include: a mobile communication device—such as a laptop computer, a tablet computer, a mobile telephone or smartphone, a "phablet," a personal digital assistant (PDA), and mobile media player; mobile speaker; and a wearable computing device—such as a computerized wrist watch or "smart" watch, and computerized eyeglasses; Internet of Things (IoT) devices; and/or other wireless devices configured for wireless communication via one or more wireless technologies; vehicles (e.g., trains, automobiles, nautical vessels, aircraft, motorcycles, bicycles, etc.) or drones configured for wireless communication, such as transportation systems that include one or more wireless communication receivers and/or wireless communication receivers transmitters, and/or automotive/aeronautical/maritime/train in-dash computer terminals.

As discussed above, the communication device 140, the base station 120, and/or the AP 122 support MIMO and SISO communications. Although exemplary aspects are described with respect to the communication device 140, the base station 120 and/or the AP can additionally (or alternatively) be configured for selectively switching between MIMO and SISO, including switching the operational mode based on radio link performance. That is, as would be understood by one of ordinary skill in the art, the features, functions, and/or operations of the communication device 140 described in the various exemplary aspects can also (or alternatively) be realized by the base station 120 and/or AP 122.

In an exemplary aspect, the communication device 140 can be configured to selectively switch between MIMO and SISO communication operations. In an exemplary aspect, the selective switching is based on the performance and/or estimated performance of the communication device 140 when operating in MIMO versus SISO. For example, with coexisting technologies (e.g. WLAN and Bluetooth) that share RF chains (RF components and antenna elements), SISO may offer a higher performance than MIMO operation due to interference (e.g. mutual interference) between the coexisting technologies during MIMO operation. In an exemplary aspect, the communication device 140 includes one or more antenna elements (or an antenna array) that are dedicated to a first communication technology (e.g. WLAN) and one more antenna elements (or an antenna array) that are shared between the first communication technology and a second communication technology (e.g. Bluetooth). For example, in a MIMO operation, the dedicated and shared antenna elements can be utilized for the first communication technology in a MIMO configuration.

In one or more exemplary aspects, the communication device 140 is configured to determine the performance and/or estimate future performance based on communication information, such as one or more wireless characteristics and/or statistics associated with one or more communication interfaces. The selective switching can be based on communication information (e.g. wireless characteristics and/or statistics associated with one or more communication interfaces), and/or based on the determined performance and/or estimated future performance.

Non-limiting examples of the wireless characteristics include the modulation and coding scheme (MCS) of one or more communication technologies, which may include MCS statistics; throughput and/or goodput statistics of one or more communication technologies; determined packet loss; communication traffic profiles (e.g. no traffic, low priority, high priority, Voice-over-LTE (VoLTE); Bluetooth hand-free profile (Bluetooth HFP), Advanced Audio Distribution Profile (A2DP)); predicted occupation statistics of coexisting communication technologies (e.g. based on communication traffic profile(s)); determined occupation statistics of coexisting communication technologies; and/or one or more wireless characteristics and/or statistics as would be understood by one of ordinary skill in the art.

In an exemplary aspect, the communication device 140 can be configured to signal or instruct (e.g. control) a peer communication device (e.g. base station, AP) to operate using the selected operation mode (MIMO or SISO). For example, a communication device 140 can transmit a communication (e.g. packet, frame, etc.) to the AP 122 to notify the AP 122 that the communication device 140 would like to operate in (and/or control the AP 122 to operate in) a SISO communication operation mode for MIMO communications, or vice versa.

In an exemplary aspect, the communication device 140 is configured for spatial multiplexing powersave (SMPS) operation. SMPS allows the communication device 140 to reducing the number of active RF chains to operate with a single active receive RF chain and/or a single active transmit chain. With SMPS, the communication device 140 can reduce power consumption (e.g. by reducing the number of active RF chains), for example, when MIMO data rates are not required.

In an exemplary aspect, the communication device 140 can be configured to selectively switch between MIMO and SISO communication operations using SMPS. The communication device 140 can selectively switch between MIMO and SISO based on the performance and/or estimated future performance (determined based on e.g. wireless character- istics/statistics), where the switching is effectuated using SMPS. In this example, the communication device 140 can use SMPS signaling to communicate the desired operating mode to one or more other communication devices (e.g. AP). In this aspect, the leveraging of SMPS to effectuate operating mode switching is based the performance and/or estimated future performance of the coexisting communications. For example, in addition to (or as an alternative to) using SMPS (e.g. SMPS signaling) for power consumption, the communication device 140 can use SMPS to improve radio link performance in coexistence communication operations, when, for example, SISO communications would provide a greater realized and/or estimated performance over MIMO communications (e.g. SISO performance>MIMO performance). The communication device 140 can then use SMPS to switch back to the MIMO operation mode when the performance gain is no longer realized (e.g. SISO performance≤MIMO performance).

Figure 2:
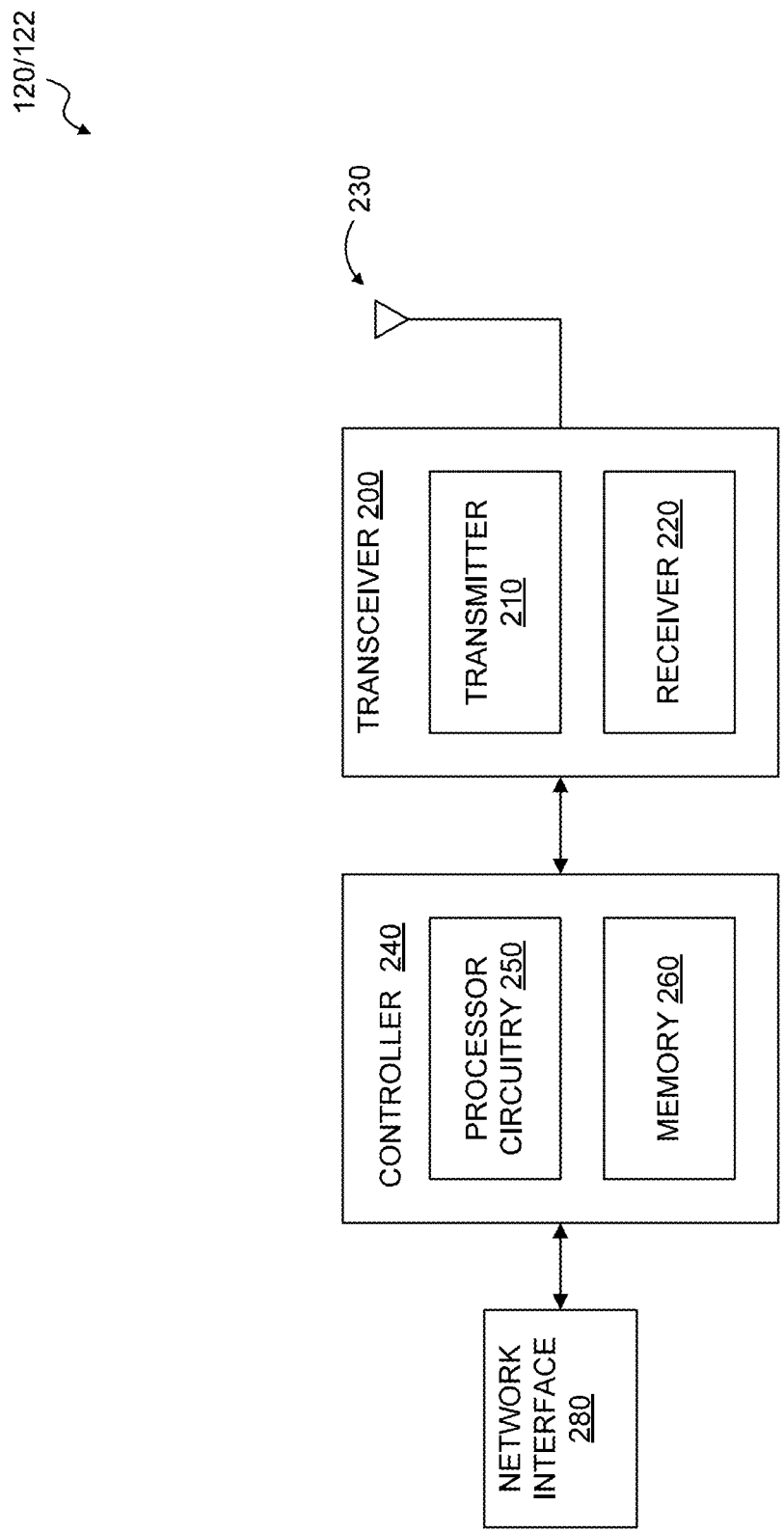
FIG. 2 illustrates a base station and/or access point according to an exemplary aspect of the present disclosure.

FIG. 2 illustrates an exemplary aspect of the base station 120 and/or AP 122. For example, the base station 120 and/or the AP 122 can include a transceiver 200 and a network interface 280, each communicatively coupled to controller 240.

The base station 120 may be, for example, an eNodeB, a small cell, a femto cell, a pico cell, a micro cell, a road side unit, or other infrastructure devices capable of wireless communications. The AP 122 can be a wireless access point, a wireless router, wireless repeater, and/or other infrastructure devices capable of wireless communications.

The transceiver 200 includes processor circuitry that is configured to transmit and/or receive wireless communications via one or more wireless technologies within the communication environment 100. For example, the transceiver 200 can include one or more transmitters 210 and one or more receivers 220 that configured to transmit and receive wireless communications, respectively, via one or more antennas 230. Those skilled in the relevant art(s) will recognize that the transceiver 200 can also include (but is not limited to) a digital signal processor (DSP), modulator and/or demodulator, a digital-to-analog converter (DAC) and/or an analog-to-digital converter (ADC), an encoder/decoder (e.g., encoders/decoders having convolution, tail-biting convolution, turbo, Viterbi, and/or Low Density Parity Check (LDPC) encoder/decoder functionality), a frequency converter (including mixers, local oscillators, and filters), Fast-Fourier Transform (FFT), precoder, and/or constellation mapper/de-mapper that can be utilized in transmitting and/or receiving of wireless communications. Further, those skilled in the relevant art(s) will recognize that the antenna 230 may include an integer array of antennas, and that the antenna 230 may be capable of both transmitting and receiving wireless communication signals.

In aspects directed to the base station 120, transceiver 200 supports one or more cellular communication protocols, such as the Long-Term Evolution (LTE) protocol, one or more fifth generation (5G) protocols, one or more vehicle-to-everything (V2X) protocols, and/or one or more other protocols as would be understood by one of ordinary skill in the art. The base station 120 is not limited to cellular technologies, and can be configured for communications that conform to one or more other cellular and non-cellular protocols (e.g. IoT, WLAN, etc.) as would be understood by one of ordinary skill in the relevant arts. In aspects directed to the AP 122, transceiver 200 supports one or more IEEE 802.11 protocols, but is not limited thereto. One of ordinary skill in the relevant arts will understand that the transceiver 200 is not limited to these example communication technologies, and can be configured for communications that conform to one or more other cellular and non-cellular protocols in addition to or alternatively to these example protocols as would be understood by one of ordinary skill in the relevant arts.

The network interface 280 includes processor circuitry that is configured to transmit and/or receive communications via one or more wired technologies to/from the backhaul communication network 111. Those skilled in the relevant art(s) will recognize that the network interface 280 can also include (but is not limited to) a digital signal processer (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will understand that the network interface 280 is not limited to wired communication technologies and can be configured for communications that conform to one or more well-known wireless technologies in addition to, or alternatively to, one or more well-known wired technologies.

The controller 240 can include processor circuitry 250 that is configured to carry out instructions to perform arithmetical, logical, and/or input/output (I/O) operations of the base station 120 and/or AP 122, and/or of one or more components of the base station 120 and/or AP 122. The processor circuitry 250 can be configured control the operation of the transceiver 200—including, for example, transmitting and/or receiving of wireless communications via the transceiver 200, and/or perform one or more baseband processing functions (e.g., media access control (MAC), encoding/decoding, modulation/demodulation, data symbol mapping, error correction, etc.). In an exemplary aspect, the controller 240 can include one or more elements of a protocol stack such as, for example, elements of an evolved universal terrestrial radio access network (EUTRAN) protocol—including, for example, physical (PHY) layer, media access control (MAC), radio link control (RLC), packet data convergence protocol (PDCP), and/or radio resource control (RRC) elements. The Non Access Stratum (NAS) is the protocol between the mobile device (UE) and the Mobility Management Entity (MME) and can be configured for authentication operations, security control and/or the generation of paging messages.

The controller 240 can further include a memory 260 that stores data and/or instructions, where when the instructions are executed by the processor circuitry 250, controls the processor circuitry 250 to perform the functions described herein. The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both.

Figure 3:
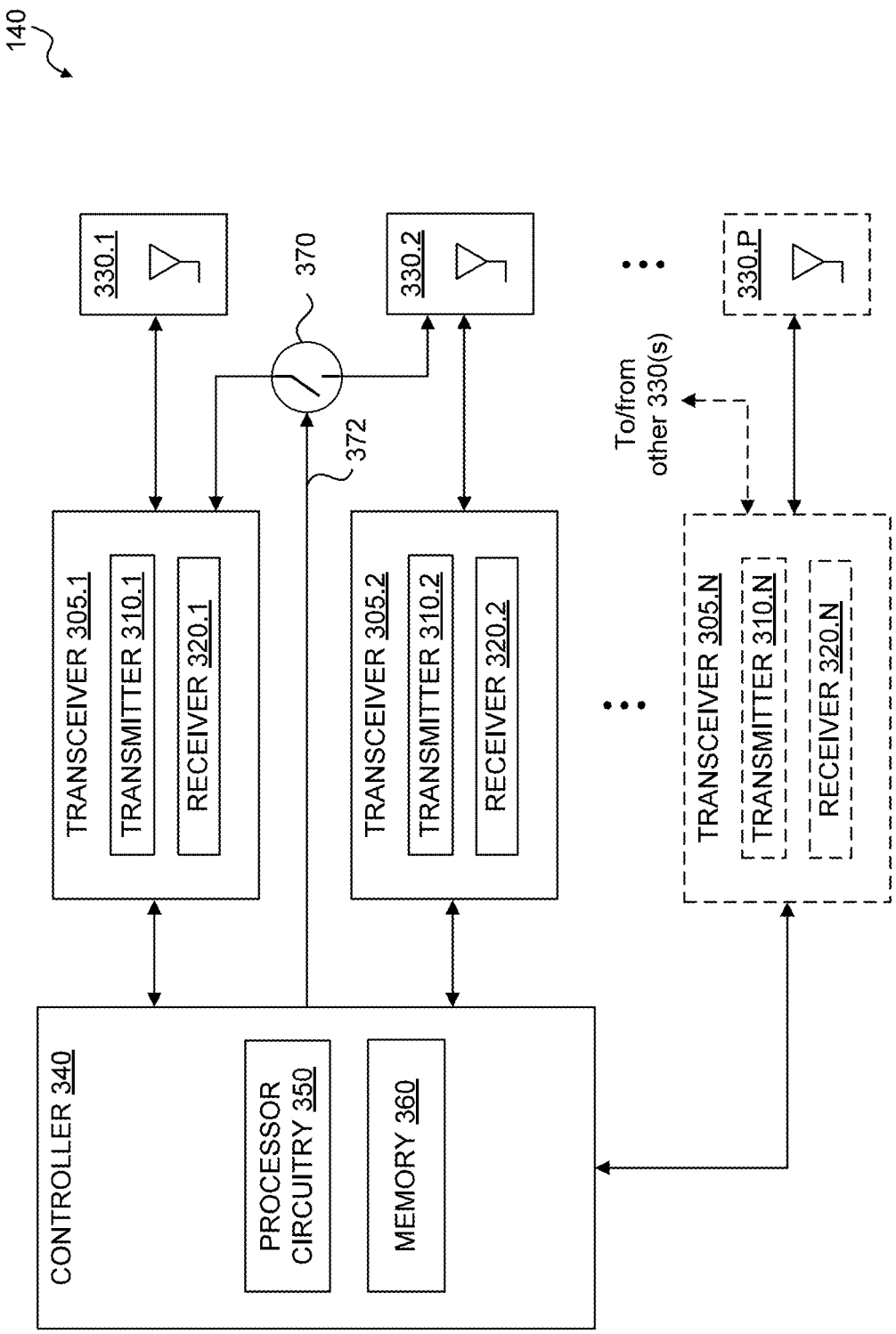
FIG. 3 illustrates a mobile device according to an exemplary aspect of the present disclosure.

FIG. 3 illustrates the communication device 140 according to an exemplary aspect of the present disclosure. The communication device 140 can include controller 340 communicatively coupled to one or more transceivers 305 configured to transmit and/or receive wireless communications via one or more wireless technologies via one or more antennas 330.

In an exemplary aspect, the communication device 140 includes transceiver 305.1 that is configured to wireless communicate via a first radio access technology (RAT) (e.g., WLAN) and a transceiver 305.2 that is configured to wireless communicate via a second RAT (e.g. Bluetooth) different from the first RAT. In this example, the transceiver 305.1 can be configured to wireless communicate via the first RAT with the AP 122 and the second transceiver 305.2 can be configured to wireless communicate via the second RAT to one or more other devices configured for communication via the second RAT (e.g. one or more other Bluetooth enabled devices). In one or more aspects, the communication device 140 can include one or more additional transceivers 305.N configured to communicate via a third, different RAT (e.g. LTE) with, for example, the base station 120. In one or more aspects, the communication device 140 includes a transceiver that is configured to communicate via one or more wired communication technologies (e.g. Ethernet).

The transceivers 305.1 to 305.N can include processor circuitry that is configured for transmitting and/or receiving wireless communications conforming to one or more wireless protocols. For example, the transceiver(s) 305 can include a transmitter 310 and a receiver 320 configured for transmitting and receiving wireless communications via one or more antennas 330. In an exemplary aspect, the transceiver 305.1 includes a WLAN modem configured for WLAN communications and the transceiver 305.2 includes a Bluetooth modem configured for Bluetooth communications. In aspects where an additional transceiver 305.N is included, the transceiver 305.N can include a modem configured for corresponding communications, such as an LTE modem configured for LTE communications.

In other exemplary aspects, one or more of the modems can be alternatively implemented within the controller 340. In one aspect, one or more of the modems is composed of multiple components with a portion of the components being implemented in the controller 340 and another portion of the components being implemented in the respective transceiver 305. In an exemplary aspect, the communication device 140 can include one or more modems that are included in the communication device 140 and separate from the controller 340 and transceiver(s) 305.

In exemplary aspects, the transceiver(s) 305 can include (but is not limited to) a digital signal processer (DSP), modulator and/or demodulator, a digital-to-analog converter (DAC) and/or an analog-to-digital converter (ADC), an encoder/decoder (e.g., encoders/decoders having convolution, tail-biting convolution, turbo, Viterbi, and/or Low Density Parity Check (LDPC) encoder/decoder functionality), a frequency converter (including mixers, local oscillators, and filters), Fast-Fourier Transform (FFT), precoder, and/or constellation mapper/de-mapper that can be utilized in transmitting and/or receiving of wireless communications.

In an exemplary aspect, one or more of the antennas 330 can be shared between two or more transceivers 305. For example, transceiver 305.1 can be configured to communicate using antennas 330.1 and 330.2, while transceiver 305.2 can be configured to communicate using antenna 330.2. In this example, antenna array 330.2 is a shared antenna that is shared by both transceivers 305.1 and 305.2, while antenna 330.1 is not shared (e.g. dedicated to transceiver 305.1). In addition to sharing antennas 330, one or more RF chains (e.g. RF components) can shared by two or more transceivers 305.

In an exemplary aspect, the communication device 140 is configured to operate in a MIMO operation mode or a SISO operation mode. In the SISO operation mode, the transceiver 305.1 is coupled to antenna 330.1, and the transceiver 305.1 can wirelessly communicate using antenna 330.1. In the MIMO operation mode, the transceiver 305.1 is coupled to both antenna 330.1 and antenna 305.2 in an antenna array arrangement. In the MIMO operation mode, the transceiver 305.1 can wirelessly communicate using both antenna 330.1 antenna 330.2 in a MIMO configuration. In an exemplary aspect, one or more of the antennas 330 can be coupled to one or more transceivers 330 via one or more switches 370. In some aspects, the switch 370 is a switch matrix configured to couple any combination of the antennas 330 to a particular transceiver 305. As illustrated in FIG. 3, the antenna 330.2 is switchably coupled to transceiver 305.1 via switch 370. The controller 340 can be configured to control the operation of the switch 370 via control line 372.

In an exemplary aspect, the controller 340 can be configured to selectively switch between the MIMO operation mode and the SISO operation mode. In this example, the controller 340 can couple both antennas 330.1 and 330.2 in an antenna array arrangement to transceiver 305.1 when operating in the MIMO operation mode. For example, the controller 340 can control the switch 370 to couple the antenna 330.2 to transceiver 305.1 so that both antennas 330.1 and 330.2 are coupled to the transceiver 305.1 in an antenna array arrangement.

In the SISO operation mode, the controller 340 can disconnect the antenna 330.2 from transceiver 305.1 by controlling the switch 370 (via control line 372) to the disconnected (i.e. open) position.

In an exemplary aspect, the controller 340 can be configured to control the communication device 140 to selectively switch between MIMO and SISO communication operations (e.g. between MIMO and SISO operation modes). In an exemplary aspect, the switching of operation modes can be based on communication information, such as one or more wireless characteristics and/or statistics associated with one or more communication interfaces. Non-limiting examples of the wireless characteristics and/or statistics can include the modulation and coding scheme (MCS) of one or more communication technologies, which may include MCS statistics; throughput and/or goodput statistics of one or more communication technologies; determined packet loss; communication traffic profiles (e.g. no traffic, low priority, high priority, Voice-over-LTE (VoLTE); Bluetooth hand-free profile (Bluetooth HFP), Advanced Audio Distribution Profile (A2DP)); predicted occupation statistics of coexisting communication technologies (e.g. based on communication traffic profile(s)); determined occupation statistics of coexisting communication technologies; and/or one or more wireless characteristics and/or statistics as would be understood by one of ordinary skill in the art.

In an exemplary aspect, the controller 340 can be configured to control the communication device 140 to selectively switch between MIMO and SISO operation modes based on one or more wireless characteristics and/or statistics (e.g. communications information) associated with one or more of the transceivers 305. In one or more aspects, the wireless characteristics and/or statistics (e.g. communications information) can be additionally or alternatively associated with one or more antennas 330 and/or communication components (e.g. RF and/or Baseband components).

In an exemplary aspect, the MIMO operation mode can include MIMO communications for receiving one or more wireless communications using a MIMO configuration. The MIMO operation mode can additional or alternatively include MIMO communications for transmitting one or more wireless communications. The SISO operation mode can similarly include SISO communications for reeving and/or transmitting wireless communications.

In an exemplary operation, the controller 340 can be configured to select the SIMO operation mode when, for example: (1) MCS in received data are lower (e.g. substantially lower) in the MIMO operation mode compared to the SISO operation mode, which may indicate that the AP 122 is rate scaling possibly due to conflicts in the shared antenna 330.2 and/or RF chain; (2) Received goodput is lower (e.g. substantially lower) MIMO operation mode compared to the SISO operation mode, which may indicated WLAN packet loss and AP rate scaling possibly due to conflicts in the shared antenna 330.2 and/or RF chain; (3) Coexisting communication traffic profiles require high occupation (e.g. predicted/estimated usage of the antenna 330.2 by Bluetooth transceiver 305.2 based on Bluetooth communication traffic profiles); (4) High reported coexisting technology occupation (e.g. determined occupation statistics of coexisting communication technologies such as Bluetooth are high); and/or (5) Increased/high number of WLAN receiving errors when Bluetooth communications are active.

In an exemplary aspect, when non-WLAN occupation and/or the occupation according to the active communication profiles is less than a threshold value (e.g. minimum threshold value), the controller 340 can be configured to activate the MIMO occupation mode. Otherwise, the controller 340 can be configured to occasionally (e.g., periodically) switch operation modes and to collect and update wireless characteristics and/or statistics (e.g. communications information) while operating on the other operation mode. The controller 340 can be configured to perform the operating mode switching based on the updated wireless characteristics and/or statistics.

In an exemplary aspect, the controller 340 can include processor circuitry 350 that is configured to determine communication information, such as one wireless characteristics and/or statistics associated with one or more communication interfaces (e.g. transceivers 305), determine the performance and/or estimate future performance of the communication device 140 when operating in the MIMO and/or SISO operation modes, and control the communication device 140 to selectively switch between the MIMO and SISO operation modes based on the determined wireless characteristics and/or statistics.

In an exemplary aspect, the processor circuitry 350 can be configured to control the overall operation of the communication device 140, such as the operation of the transceiver(s) 305—including, for example, transmitting and/or receiving of wireless communications via the transceiver(s) 305, and/or perform one or more baseband processing functions (e.g., media access control (MAC), encoding/decoding, modulation/demodulation, data symbol mapping, error correction, etc.); the running of one or more applications and/or operating systems; power management (e.g., battery control and monitoring); display settings; volume control; and/or user interactions via one or more user interfaces (e.g., keyboard, touchscreen display, microphone, speaker, etc.). In an exemplary aspect, the controller 340 can include one or more elements of a protocol stack such as, a physical (PHY) layer, media access control (MAC), radio link control (RLC), packet data convergence protocol (PDCP), and/or radio resource control (RRC) elements. The Non Access Stratum (NAS) is the protocol between the mobile device (UE) and the Mobility Management Entity (MME) and can be configured for authentication operations, security control and/or the generation of paging messages.

The controller 340 can further include a memory 360 that stores data and/or instructions, where when the instructions are executed by the processor circuitry 350, controls the processor circuitry 350 to perform the functions described herein. The memory 360 can be any well-known volatile and/or non-volatile memory, and can be non-removable, removable, or a combination of both.

Figure 4:
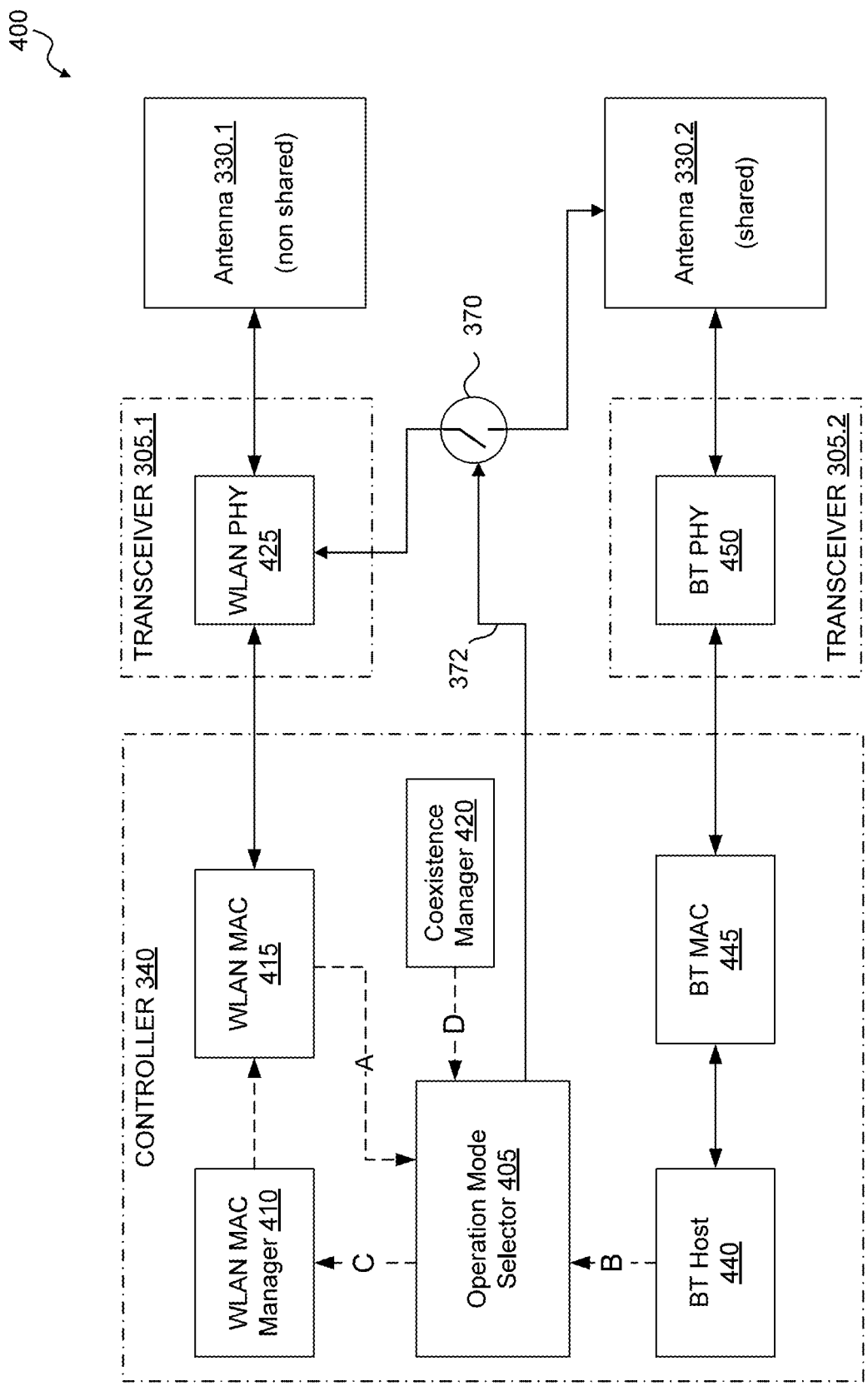
FIG. 4 illustrates a mobile device according to an exemplary aspect of the present disclosure.

FIG. 4 illustrates the communication device 400 according to an exemplary aspect of the present disclosure. The communication device 400 can be an embodiment of the communication device 140. For example, the communication device 400 can include controller 340 communicatively coupled to one or more transceivers 305 configured to transmit and/or receive wireless communications via one or more wireless technologies via one or more antennas 330.

In an exemplary aspect, the controller 340 can include operation mode selector 405, WLAN media access control (MAC) manager 410, WLAN MAC 415, coexistence manager 420, Bluetooth host 440, and Bluetooth MAC 445. The transceiver 305.1 can include WLAN PHY 425 and the transceiver 305.2 can include Bluetooth PHY 450. Similar to the aspects described with reference to FIG. 3, the communication device 400 includes one or more shared (e.g. 330.2) and non-shared (e.g. 330.1) antennas. In an exemplary aspect, the operation mode selector 405, WLAN MAC manager 410, WLAN MAC 415, coexistence manager 420, Bluetooth host 440, and/or Bluetooth MAC 445 are implemented in processor circuitry 350.

In an exemplary aspect, the WLAN MAC manager 410 is configured to generate a frame to notify a peer communication device that the communication device 400 of the intended operation mode of communication device 400 and/or instruct the peer communication device to operate in the intended operation mode of the communication device 400. In an exemplary aspect, the generated frame is a spatial multiplexing powersave (SMPS) frame. The WLAN MAC manager 410 can provide the generated frame to the WLAN MAC 415, which can be configured to transmit the frame to the peer communication device via the WLAN PHY 425 and antennas 330.1 and/or 330.2. The WLAN MAC 415 can also provide the modulation and coding scheme (MCS) of received WLAN communications and/or goodput statistics of received WLAN communications to the operation mode selector 405 via data path A.

The WLAN PHY 425 can be configured to perform one or more processing operations (e.g. encoding) on the generated frame and provide the processed frame to the antennas 330.1 and/or 330.2 for transmission to the peer device. The WLAN PHY 425 can perform the processing operation(s) (e.g. decoding) on data received via the antennas 330.1 and/or 330.2.

The coexistence manager 420 can be configured to measure or otherwise determine communication information, such as one wireless characteristics and/or statistics associated with the WLAN interface and/or the Bluetooth interface. For example, the coexistence manager 420 can determine coexisting communication traffic profiles and/or coexisting technology occupation of the Bluetooth interface. The coexistence manager 420 can provide the determined communication information to the operation mode selector 405 via data path D.

The Bluetooth (BT) host 440 is configured to facilitate communications between applications and the controller 340. The Bluetooth host 440 can determine the one or more coexisting (e.g. Bluetooth) communication traffic profiles for the Bluetooth communications and can provide the Bluetooth communication traffic profile(s) to the operation mode selector 405 via data path B. The Bluetooth host 440 can be configured to provide Bluetooth communications based on the traffic profiles to the Bluetooth MAC 445, which can be configured to facilitate communication of the Bluetooth communications via the Bluetooth PHY and antenna 330.2.

The Bluetooth PHY 450 can be configured to perform one or more processing operations (e.g. encoding) on the Bluetooth communications and provide the processed communications to the antenna 330.2 for transmission to the peer device. The Bluetooth PHY 450 can perform the processing operation(s) (e.g. decoding) on data received via the antenna 330.2.

The operation mode selector 405 can be configured to selectively switch between the MIMO operation mode and the SISO operation mode. In this example, the operation mode selector 405 can control the coupling of both antennas 330.1 and 330.2 in an antenna array arrangement to transceiver 305.1 when operating in the MIMO operation mode. For example, the operation mode selector 405 can control the switch 370 to couple the antenna 330.2 to transceiver 305.1 so that both antennas 330.1 and 330.2 are coupled to the transceiver 305.1 in an antenna array arrangement.

In the SISO operation mode, the operation mode selector 405 can disconnect the antenna 330.2 from transceiver 305.1 by controlling the switch 370 (via control line 372) to the disconnected (i.e. open) position.

In an exemplary aspect, the operation mode selector 405 can be configured to control the communication device 400 to selectively switch between MIMO and SISO communication operations (e.g. between MIMO and SISO operation modes). In an exemplary aspect, the switching of operation modes can be based on communication information, such as one or more wireless characteristics and/or statistics associated with one or more communication interfaces.

For example, the operation mode selector 405 can receive the modulation and coding scheme (MCS) of received WLAN communications and/or goodput statistics of received WLAN communications from the WLAN MAC 415; coexisting (e.g. Bluetooth) communication traffic profiles from the Bluetooth Host 440; and/or coexisting communication traffic profiles and/or coexisting technology occupation of the Bluetooth interface from the coexistence manager 420.

In an exemplary aspect, the operation mode selector 405 can be configured to control the communication device 400 to selectively switch between MIMO and SISO operation modes based on the received wireless characteristics and/or statistics.

In an exemplary operation, the operation mode selector 405 can be configured to select the SISO operation mode when, for example: (1) MCS in received data are lower (e.g. substantially lower) in the MIMO operation mode compared to the SISO operation mode, which may indicate that the AP 122 is rate scaling possibly due to conflicts in the shared antenna 330.2 and/or RF chain; (2) Received goodput is lower (e.g. substantially lower) MIMO operation mode compared to the SISO operation mode, which may indicated WLAN packet loss and AP rate scaling possibly due to conflicts in the shared antenna 330.2 and/or RF chain; (3) Coexisting communication traffic profiles require high occupation (e.g. predicted/estimated usage of the antenna 330.2 by Bluetooth transceiver 305.2 based on Bluetooth communication traffic profiles); (4) High reported coexisting technology occupation (e.g. determined occupation statistics of coexisting communication technologies such as Bluetooth are high; e.g. duration of Bluetooth interface's use of the antenna 330.2 is high); and/or (5) Increased/high number of WLAN receiving errors when Bluetooth communications are active.

In an exemplary aspect, when non-WLAN occupation and/or the occupation according to the active communication profiles is less than a threshold value (e.g. minimum threshold value), the operation mode selector 405 can be configured to activate the MIMO occupation mode. Otherwise, the operation mode selector 405 can be configured to occasionally (e.g., periodically) switch operation modes and to collect and update wireless characteristics and/or statistics (e.g. communications information) while operating on the other operation mode. The controller 340 can be configured to perform the operating mode switching based on the updated wireless characteristics and/or statistics.

In an exemplary aspect, the operation mode selector 405 can include processor circuitry that is configured to determine communication information, such as one wireless characteristics and/or statistics, determine the performance and/or estimate future performance of the communication device 400 when operating in the MIMO and/or SISO operation modes, and control the communication device 400 to selectively switch between the MIMO and SISO operation modes based on the determined wireless characteristics and/or statistics.

In an exemplary aspect, one or more of the antennas 330 can be shared between two or more transceivers 305. For example, transceiver 305.1 can be configured to communicate using antennas 330.1 and 330.2, while transceiver 305.2 can be configured to communicate using antenna 330.2. In this example, antenna array 330.2 is a shared antenna that is shared by both transceivers 305.1 and 305.2, while antenna 330.1 is not shared (e.g. dedicated to transceiver 305.1). In addition to sharing antennas 330, one or more RF chains (e.g. RF components) can shared by two or more transceivers 305.

In an exemplary aspect, the communication device 400 is configured to operate in a MIMO operation mode or a SISO operation mode. In the SISO operation mode, the transceiver 305.1 is coupled to antenna 330.1, and the transceiver 305.1 can wirelessly communicate using antenna 330.1. In the MIMO operation mode, the transceiver 305.1 is coupled to both antenna 330.1 and antenna 305.2 in an antenna array arrangement. In the MIMO operation mode, the transceiver 305.1 can wirelessly communicate using both antenna 330.1 antenna 330.2 in a MIMO configuration. In an exemplary aspect, one or more of the antennas 330 can be coupled to one or more transceivers 330 via one or more switches 370. In some aspects, the switch 370 is a switch matrix configured to couple any combination of the antennas 330 to a particular transceiver 305. As illustrated in FIG. 4, the antenna 330.2 is switchably coupled to transceiver 305.1 via switch 370. The operation mode selector 405 can be configured to control the operation of the switch 370 via control line 372.

In an exemplary aspect, the operation mode selector 405, WLAN MAC manager 410, WLAN MAC 415, coexistence manager 420, Bluetooth host 440, and/or Bluetooth MAC 445 can include processor circuitry that is configured to perform one or more functions and/or operations of the respective component.

Figure 5:
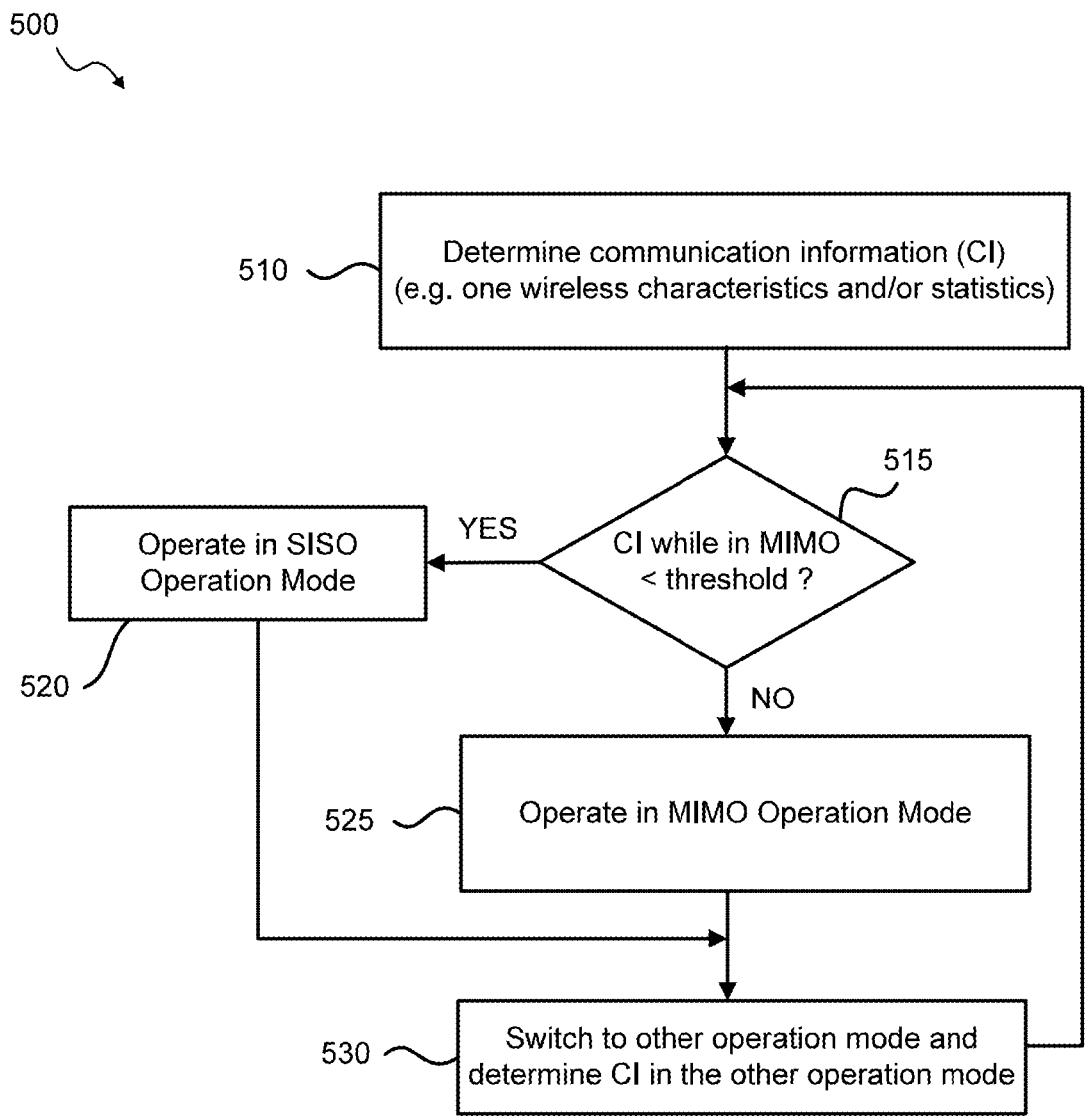
FIG. 5 illustrates an operation mode switching method according to exemplary aspects of the present disclosure.

FIG. 5 illustrates operation mode switching method according to exemplary aspects of the present disclosure. The flowchart 500 is described with continued reference to FIGS. 1-4. The operations of the methods are not limited to the order described below, and the various operations may be performed in a different order. Further, two or more operations of the methods may be performed simultaneously with each other.

As illustrated in FIG. 5 the flowchart 500 begins at operation 510, where communication information, such as one wireless characteristics and/or statistics, are determined.

After operation 510, the flowchart 500 transitions to operation 515, where the operation mode is determined based on the determined communication information (e.g. wireless characteristics and/or statistics). In an exemplary aspect, when the communication information indicates that the performance and/or estimated future performance of the communication device 140 when operating in the MIMO is less than a performance threshold (YES at operation 515), the flowchart 500 transitions to operation 520, where the communication device 140 switches to the SISO operation mode using one or more spatial multiplexing powersave (SMPS) frames.

After operation 520, the flowchart 500 transitions to operation 530, where the operation mode is occasionally switched to the other operation mode (e.g. MIMO) and communication information is determined while in the MIMO operation mode. The flowchart 500 then returns to operation 515.

If the communication information indicates that the performance and/or estimated future performance of the communication device 140 when operating in the MIMO greater or equal to the performance threshold (NO at operation 515), the flowchart 500 transitions to operation 525, where the communication device 140 switches to (or maintains) the other operation mode using one or more SMPS frames.

After operation 525, the flowchart 500 transitions to operation 530, where the operation mode is occasionally switched to the other operation mode (e.g. SISO) and communication information is determined while in the other operation mode. The flowchart 500 then returns to operation 515.

EXAMPLES

Example 1 is a communication device configured to operate in a Multiple-input Multiple-output (MIMO) operation mode and Single-input Single output (SISO) operation mode, comprising: a first transceiver associated with a first antenna, and configured to wirelessly communicate using the first antenna via a first communication technology; a second transceiver associated with a second antenna, and configured to wirelessly communication using the second antenna via a second communication technology different from the first communication technology; and a controller coupled to the first transceiver and the second transceiver, the controller configured to: determine communication information corresponding to the first and the second communication technologies; and control the communication device to switch an operation mode of the communication device between the MIMO operation mode and the SISO operation mode based on the determined communication information.

In Example 2, the subject matter of Example 1, further comprising a third transceiver coupled to the controller, and configured to communicate using a third communication technology different from the first and the second communication technologies.

In Example 3, the subject matter of Example 1, wherein the controller is further configured to: generate one or more spatial multiplexing powersave (SMPS) frames based on the determined communication information; and transmit the one or more SMPS frames to another communication device to facilitate wireless communication using the switched operation mode with the other communication device.

In Example 4, the subject matter of Example 1, wherein the controller is further configured to: generate one or more spatial multiplexing powersave (SMPS) frames based on the determined communication information; and transmit the one or more SMPS frames to another communication device to instruct the other communication device to communicate with the communication device using the switched operation mode.

In Example 5, the subject matter of any of Examples 1-4, wherein the controller is further configured to: selectively couple the second antenna to the first transceiver based on the operation mode of the communication device.

In Example 6, the subject matter of Example 5, wherein the second antenna is coupled to the first transceiver when the operation mode of the communication device is the MIMO operation mode.

In Example 7, the subject matter of Example 5, wherein the second antenna is decoupled from the first transceiver when the operation mode of the communication device is the SISO operation mode.

In Example 8, the subject matter of any of Examples 1-7 wherein the controller is further configured to: determine a communication performance of the communication device, based on the communication information, when operating in the MIMO operation mode and/or the SISO operation mode; and control the communication device to switch the operation mode of the communication device between the MIMO operation mode and the SISO operation mode based on the determined performance.

In Example 9, the subject matter of Example 8, wherein the communication information comprises wireless characteristics and statistics of the first communication technology when operating in the MIMO operation mode and/or the SISO operation mode.

In Example 10, the subject matter of any of Examples 1-7, wherein the communication information comprises wireless characteristics and statistics of the first communication technology when operating in the MIMO operation mode and/or the SISO operation mode.

In Example 11, the subject matter of any of Examples 1-10, wherein the wireless characteristics and statistics comprise at least one of: modulation and coding scheme (MCS) of at least the first communication technology; throughput and/or goodput information of at least the first communication technology; determined packet loss of at least the first communication technology; one or more communication traffic profiles; predicted occupation statistics of the second communication technology; and occupation statistics of the second communication technology on the second antenna.

In Example 12, the subject matter of any of Examples 1-11, wherein the first communication technology conforms to one or more Institute of Electrical and Electronics Engineers (IEEE) 802.11 protocols and the second communication technology conforms to one or more Bluetooth protocols.

Example 13 is an operation mode switching method for switching an operation mode of a communication device between a Multiple-input Multiple-output (MIMO) operation mode and Single-input Single output (SISO) operation mode, the method comprising: determine communication information corresponding to a first communication technology associated with a first antenna and a second communication technology associated with a second antenna, the second communication technology being different from the first communication technology; and switching the operation mode of the communication device between the MIMO operation mode and the SISO operation mode based on the determined communication information.

In Example 14, the subject matter of Example 13, further comprising: generating one or more spatial multiplexing powersave (SMPS) frames based on the determined communication information; and transmitting the one or more SMPS frames to another communication device to facilitate wireless communication using the switched operation mode with the other communication device.

In Example 15, the subject matter of Example 13, further comprising: generating one or more spatial multiplexing powersave (SMPS) frames based on the determined communication information; and transmitting the one or more SMPS frames to another communication device to instruct the other communication device to communicate with the communication device using the switched operation mode.

In Example 16, the subject matter of any of Examples 13-15, further comprising: selectively coupling, based on the operation mode of the communication device, the second antenna to a first transceiver associated with the first antenna and configured to wireless communicate using the first communication technology.

In Example 17, the subject matter of Example 16, wherein the second antenna is coupled to the first transceiver when the operation mode of the communication device is the MIMO operation mode.

In Example 18, the subject matter of Example 16, wherein the second antenna is decoupled from the first transceiver when the operation mode of the communication device is the SISO operation mode.

In Example 19, the subject matter of any of Examples 13-18, further comprising: determining a communication performance of the communication device, based on the communication information, when operating in the MIMO operation mode and/or the SISO operation mode; and switching the operation mode of the communication device between the MIMO operation mode and the SISO operation mode based on the determined performance.

In Example 20, the subject matter of any of Examples 13-19, wherein the communication information comprises wireless characteristics and statistics of the first communication technology when operating in the MIMO operation mode and/or the SISO operation mode.

In Example 21, the subject matter of any of Examples 13-20, wherein the communication information comprises wireless characteristics and statistics of the first communication technology when operating in the MIMO operation mode and/or the SISO operation mode.

In Example 22, the subject matter of any of Examples 13-21, wherein the wireless characteristics and statistics comprise at least one of: modulation and coding scheme (MCS) of at least the first communication technology; throughput and/or goodput information of at least the first communication technology; determined packet loss of at least the first communication technology; one or more communication traffic profiles; predicted occupation statistics of the second communication technology; and occupation statistics of the second communication technology on the second antenna.

In Example 23, the subject matter of any of Examples 13-22, wherein the first communication technology conforms to one or more Institute of Electrical and Electronics Engineers (IEEE) 802.11 protocols and the second communication technology conforms to one or more Bluetooth protocols.

Example 24 is an apparatus comprising means to perform the method as described in any of Examples 13-23.

Example 25 is a communication device comprising a processor and a memory that stores program instructions, the processor being configured to execute the program instructions to perform the method as described in any of Examples 13-23.

Example 26 is a non-transitory computer-readable storage medium with program instructions stored thereon, when executed, causes a processor to perform the method of any of Examples 13-23.

Example 27 is an apparatus substantially as shown and described.

Example 28 is a method substantially as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

As will be apparent to a person of ordinary skill in the art based on the teachings herein, exemplary aspects are not limited to Long-Term Evolution (LTE) and/or IEEE 802.11 protocols, and can be applied to other cellular communication standards, including (but not limited to) LTE Advanced, one or more fifth generation (5G) communications, Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), Worldwide Interoperability for Microwave Access (WiMAX) (Institute of Electrical and Electronics Engineers (IEEE) 802.16), and/or one or more cellular communications using one or frequency bands of the industrial, scientific and medical (ISM) radio bands to provide some examples. Further, exemplary aspects are not limited to cellular communication networks and can be used or implemented in other kinds of wireless communication access networks, including (but not limited to) Bluetooth, Near-field Communication (NFC) (ISO/IEC 18092), ZigBee (IEEE 802.15.4), Z-Wave, Radio-frequency identification (RFID), and/or one or more non-cellular communications using one or frequency bands of the ISM radio bands to provide some examples. Further, exemplary aspects are not limited to the above wireless networks and can be used or implemented in one or more wired networks using one or more well-known wired specifications and/or protocols.

What is claimed is:

1. A communication device configured to operate in a Multiple-input Multiple-output (MIMO) operation mode and Single-input Single output (SISO) operation mode, comprising:
a first transceiver associated with a first antenna, and configured to wirelessly communicate using the first antenna via a first communication technology;
a second transceiver associated with a second antenna, and configured to wirelessly communication using the second antenna via a second communication technology different from the first communication technology; and a controller coupled to the first transceiver and the second transceiver, the controller configured to:
determine communication information corresponding to the first and the second communication technologies;
determine, based on the communication information: a MIMO communication performance of the communication device and a SISO communication performance of the communication device; and
based on a comparison of the determined MIMO communication performance and the SISO communication performance, control the communication device to:
switch an operation mode of the communication device between the MIMO operation mode in which the second antenna is coupled to the first transceiver and the SISO operation mode in which the second antenna is decoupled from the first transceiver; and
notify another communication device to facilitate wireless communication with the other communication device using the switched operation mode.

2. The communication device of claim 1, further comprising a third transceiver coupled to the controller, and configured to communicate using a third communication technology different from the first and the second communication technologies.

3. The communication device of claim 1, wherein, to notify the other communication device, the controller is further configured to:
generate one or more spatial multiplexing powersave (SMPS) frames based on the comparison of the determined MIMO communication performance and the SISO communication performance; and
transmit the one or more SMPS frames to the other communication device.

4. The communication device of claim 1, wherein, to notify the other communication device, the controller is further configured to:
generate one or more spatial multiplexing powersave (SMPS) frames based on the comparison of the determined MIMO communication performance and the SISO communication performance; and
transmit the one or more SMPS frames to the other communication device to instruct the other communication device to communicate with the communication device using the switched operation mode.

5. The communication device of claim 1, wherein the controller is further configured to:
selectively couple the second antenna to the first transceiver based on the operation mode of the communication device.

6. The communication device of claim 1, wherein the communication information comprises wireless characteristics and statistics of the first communication technology when operating in the MIMO operation mode or the SISO operation mode.

7. The communication device of claim 1, wherein the communication information comprises wireless characteristics and statistics of the first communication technology when operating in the MIMO operation mode and the SISO operation mode.

8. The communication device of claim 7, wherein the wireless characteristics and statistics comprise at least one of:
modulation and coding scheme (MCS) of at least the first communication technology;
throughput or goodput information of at least the first communication technology;
determined packet loss of at least the first communication technology;
one or more communication traffic profiles;
predicted occupation statistics of the second communication technology; and
occupation statistics of the second communication technology on the second antenna.

9. The communication device of claim 1, wherein the first communication technology conforms to one or more Institute of Electrical and Electronics Engineers (IEEE) 802.11 protocols and the second communication technology conforms to one or more Bluetooth protocols.

10. The communication device of claim 1, wherein:
the MIMO communication performance is a performance of the communication device when operating in the MIMO operation mode; and
the SISO communication performance is a performance of the communication device when operating in the SISO operation mode.

11. The communication device of claim 1, wherein:
the MIMO communication performance comprises an estimated future MIMO performance of communication device for a future operation in the MIMO operation mode by the communication device; or
the SISO communication performance comprises an estimated future SISO performance of communication device for a future operation in the SISO operation mode by the communication device.

12. The communication device of claim 1, wherein:
the MIMO communication performance comprises an estimated future MIMO performance of communication device for a future operation in the MIMO operation mode by the communication device; and
the SISO communication performance comprises an estimated future SISO performance of communication device for a future operation in the SISO operation mode by the communication device.

13. An operation mode switching method for switching an operation mode of a communication device between a Multiple-input Multiple-output (MIMO) operation mode and Single-input Single output (SISO) operation mode, the method comprising:
determining communication information corresponding to a first communication technology associated with a first antenna and a second communication technology associated with a second antenna, the second communication technology being different from the first communication technology;
determining, based on the communication information: a MIMO communication performance of the communication device and a SISO communication performance of the communication device; and
based on a comparison of the determined MIMO communication performance and the SISO communication performance:
switching the operation mode of the communication device between the MIMO operation mode in which the second antenna is coupled to the first transceiver and the SISO operation mode in which the second antenna is decoupled to the first transceiver; and notifying another communication device to facilitate wireless communication with the other communication device using the switched operation mode.

14. The method of claim 13, wherein notifying the other communication device further comprises:
generating one or more spatial multiplexing powersave (SMPS) frames based on the comparison of the determined MIMO communication performance and the SISO communication performance; and
transmitting the one or more SMPS frames to the other communication device.

15. The method of claim 13, further comprising:
generating one or more spatial multiplexing powersave (SMPS) frames based on the comparison of the determined MIMO communication performance and the SISO communication performance; and
transmitting the one or more SMPS frames to the other communication device to instruct the other communication device to communicate with the communication device using the switched operation mode.

16. The method of claim 13, wherein the communication information comprises wireless characteristics and statistics of the first communication technology when operating in the MIMO operation mode or the SISO operation mode.

17. The method of claim 13, wherein the communication information comprises wireless characteristics and statistics of the first communication technology when operating in the MIMO operation mode and the SISO operation mode.

18. The method of claim 17, wherein the wireless characteristics and statistics comprise at least one of:
modulation and coding scheme (MCS) of at least the first communication technology;
throughput or goodput information of at least the first communication technology;
determined packet loss of at least the first communication technology;
one or more communication traffic profiles;
predicted occupation statistics of the second communication technology; and
occupation statistics of the second communication technology on the second antenna.

19. The method of claim 13, wherein the first communication technology conforms to one or more Institute of Electrical and Electronics Engineers (IEEE) 802.11 protocols and the second communication technology conforms to one or more Bluetooth protocols.

20. A communication device comprising a processor and a memory that stores program instructions, the processor being configured to execute the program instructions to perform the method as claimed in claim 13.

21. A non-transitory computer-readable storage medium with program instructions stored thereon, when executed, causes a processor to perform the method of claim 13.

* * * * *